United States Patent Office 2,711,428
Patented June 21, 1955

2,711,428

1-(BICYCLIC CARBOCYCLIC ARYL)-2-(MONOCYCLIC CARBOCYCLIC ARYL) ETHYLAMINES

Louis H. Goodson, Kansas City, Mo., Robert Bruce Moffett and James E. Stafford, Kalamazoo, Mich., and Willard M. Hoehn, Kansas City, Mo., assignors to George A. Breon & Company, Kansas City, Mo., a corporation of Missouri No Drawing. Application November 19, 1948,
Serial No. 61,122

11 Claims. (Cl. 260—570.5)

This invention relates to certain 1,2-diarylethylamines and salts thereof which are valuable as pharmaceutical agents and to the preparation thereof.

We have discovered that certain 1-(bicyclic carbocyclic aryl) - 2 - (monocyclic carbocyclic aryl)ethylamines, and salts thereof, are useful as pharmacological agents, for example, for producing mild analgesia.

Our new amines have the general formula

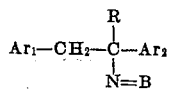

where $Ar_1$ is a monocyclic carbocyclic aryl group, for example phenyl, halophenyl, alkylphenyl, alkoxyphenyl, etc.; $Ar_2$ is a bicyclic carbocyclic fused-ring aryl radical, for example, a radical of the naphthyl, dihydronaphthyl, tetrahydronaphthyl, indenyl, or indanyl series; R is a member of the group consisting of hydrogen and lower alkyl groups having 1–4 carbon atoms; and —N=B is an amino group of the class consisting of the primary amino group —$NH_2$, and aliphatic, cycloaliphatic, and araliphatic amino groups wherein the number of carbon atoms is 1–12, these groups including, for example, mono- and di-alkylamino, such as methylamino, ethylamino, isopropylamino, n-hexylamino, dimethylamino, diethylamino, di-n-butylamino, etc.; alkenylamino, such as allylamino, methallylamino, etc.; mono- and bis-(haloalkyl)amino, such as 2-bromoethylamino, 2 - chloroethylamino, bis(2 - chloroethyl), etc.; mono- and bis-(hydroxyalkyl)amino, such as 2-hydroxyethylamino, (2-hydroxy-1-propyl)-amino, bis(2-hydroxyethyl)amino, etc.; aminoalkylamino, such as 2-diethylaminoethylamino, 2-dimethylaminoethylamino, 3-diethylaminopropylamino, 2-(2-hydroxyethylamino)-ethylamino, 1-methyl-4-(diethylamino)butylamino, etc.; mono- and di-cycloalkylamino, such as cyclopentylamino, cyclohexylamino, dicyclohexylamino etc.; cyclic polymethyleneimino, such as 1-piperidino, 2-methyl-1-piperidino, 1-pyrrolidino, etc.; cyclic polymethyleneimino interrupted by a hetero atom, such as 4-morpholino, N-piperazino, etc.; and aralkylamino, such as benzylamino, etc. The divalent grouping =B can thus be two separate monovalent radicals such as hydrogen and alkyl, dialkyl, etc., or can be a single divalent radical such as alkylene, or hetero-interrupted alkylene.

The compounds of our invention can be prepared by several synthetic methods. The method of choice in the preparation of a particular compound will vary according to availability or cost of the starting materials, yield of desired product, etc. In general, we have found it convenient to use one of the following processes.

1. A carbonyl compound having the formula $Ar_2$—CO—R is condensed with a primary amine having the formula $H_2N$—B', where B' represents an aliphatic, cycloaliphatic, or araliphatic radical wherein the number of carbon atoms is 1–12. The imine thus formed is treated with a Grignard reagent having the formula $Ar_1$—Mg—halogen, and the Grignard addition product is hydrolyzed with mineral acid, thus yielding an amine having the formula $$Ar_1—CH_2—C(R_1)(Ar_2)—NH—B'$$

These reactions can be represented by the following equations:

(a) $Ar_2$—CO—R + $H_2$N—B' ⟶ $Ar_2$—C(:N—B')—R (b) $Ar_2$—C(:N—B')—R + $Ar_1$—Mg—halogen ⟶
(Addition Product)

(c) (Addition Product) $\xrightarrow{H^+}$ $Ar_1$—$CH_2$—C(R)($Ar_2$)—NH—B,

It will be understood that this process is useful for obtaining those amines where the group —N=B is the secondary amino grouping —NH—B'; the group —B' thus being, for example, alkyl, alkenyl, haloalkyl, hydroxyalkyl, aminoalkyl, cyclohexyl, benzyl, etc. A specific example of this process is represented by the following equations:

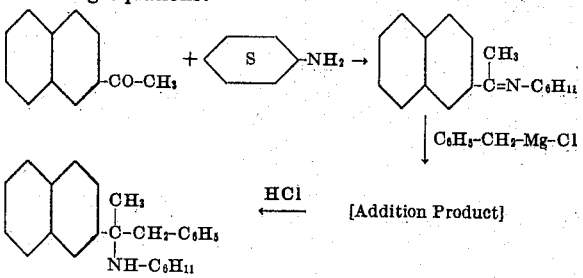

When, as starting materials in the above process, 1,2-alkanolamine such as ethanolamine is employed as the primary amine and the carbonyl compound is $Ar_2$—CO—H (i. e., R is hydrogen), the condensation product may be a 2-$Ar_2$-oxazolidine instead of the isomeric imine. However, the oxazolidine reacts in the subsequent Grignard reaction in the typical manner of the imines and thus the isomeric structure of the intermediate product is without consequence in the over-all process.

2. A ketone having the formula $Ar_2$—CO—$CH_2$—$Ar_1$ is treated with a salt of hydroxylamine, e. g. hydroxylamine hydrochloride, and the Ketoxime thus formed is reduced to the corresponding amino compound. If desired, this primary amine can in some instances be alkylated in conventional manner to yield a secondary or tertiary amine derivative. These reactions can be represented by the following equations.

(a) $Ar_2$—CO—$CH_2$—$Ar_1$ + $H_2$N—OH·HCl ⟶
   $Ar_2$—C(:N—OH)—$CH_2$—$Ar_1$ (b) $Ar_2$—C(:N—OH)—$CH_2$—$Ar_1$ + $H_2$ ⟶
   $Ar_2$—CH($NH_2$)—$CH_2$—$Ar_1$ (c) $Ar_2$—CH($NH_2$)—$CH_2$—$Ar_1$ $\xrightarrow{\text{alkylation}}$ $Ar_2$—CH(NHB')—$CH_2$—$Ar_1$
   or
   $Ar_2$—CH(N:B)—$CH_2$—$Ar^1$ A specific example of this process is represented by the following equations:

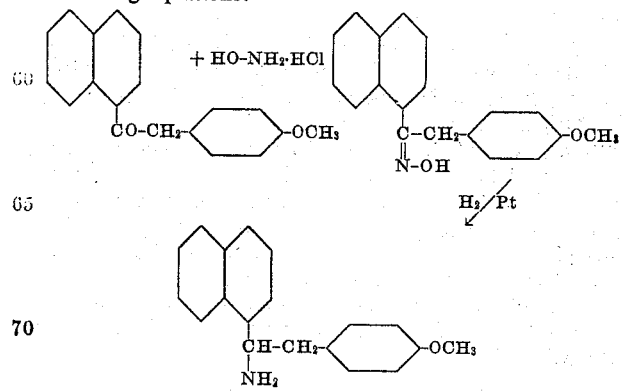

3. A halogen compound having the formula

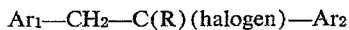

is treated with ammonia, or a primary or secondary amine having the formula H—N=B. The reaction proceeds according to the following equation.

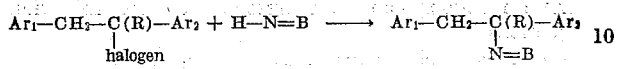

It will be understood that in using this process best results are obtained when secondary amines are employed, since in these instances a minimum of by-products will be formed in the condensation reaction.

It is frequently preferable to isolate the 1,2-diarylethylamine as a salt, such as the hydrochloride, from which, if desired, the free amine can be liberated by treatment with alkali.

The amines of our invention are in many cases water-insoluble oils and it is often convenient to use them therapeutically as the more water-soluble acid addition salts, such as those derived from non-toxic inorganic acids, including hydrochloric acid, hydrobromic acid, sulfuric acid, phosphoric acid, nitric acid, and the like, and non-toxic organic acids, including tartaric acid, citric acid, succinic acid, and the like, can be employed. Our compounds can also be used in the form of quaternary ammonium salts derived from lower alkyl esters of strong inorganic esters, organic sulfonic acids and the like, such as methyl chloride, methyl bromide, methyl iodide, ethyl bromide, methyl sulfate, etc.

Our invention is illustrated by the following examples without, however, being limited thereto.

EXAMPLE 1

*N-methyl-alpha-(4-methoxy-1-naphthyl)phenethylamine*

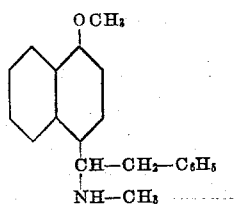

A. 45 g. of 4-methoxy-1-naphthaldehyde was dissolved in benzene. The solution was cooled to 12° C. and to it was added a solution of 21 g. of methylamine in benzene. The mixture was shaken vigorously in a stoppered flask and allowed to stand at room temperature for two days. The mixture was then distilled. The fraction distilling at 123° C. (0.065 mm.) weighed 46.5 g. It solidified on cooling. When recrystallized from petroleum ether, this product, N-methyl-4-methoxy-1-naphthalimine, melted at 61–62° C.

B. 30 g. of N-methyl-4-methoxy-1-naphthalimine was dissolved in anhydrous ether and to this solution was added an anhydrous ether solution of benzylmagnesium chloride, the Grignard reagent being prepared by the interaction of 110 g. of benzyl chloride and 25 g. of magnesium. The reaction mixture was heated under reflux on a steam bath for two hours. The reaction mixture was then cooled and poured into a mixture of ice and hydrochloric acid. The precipitate which separated was collected on a filter, dried, and crystallized from a methanol-acetone mixture. There was thus obtained 25.2 g. of N-methyl-alpha-(4-methoxy-1-naphthyl)phenethylamine hydrochloride, M. P. 212–218° C.

EXAMPLE 2

*p-Chloro-N-(2-hydroxyethyl)-alpha-(2-ethoxy-1-naphthyl)phenethylamine*

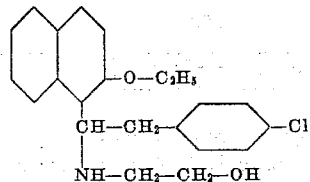

A. 32.2 g. of 2-ethoxy-1-naphthaldehyde was dissolved in 100 ml. of hot benzene. The solution was cooled slowly and, as soon as the aldehyde began to crystallize, 32.2 g. of ethanolamine was added slowly to the solution. The mixture was heated on a steam bath for seven or eight hours. The solution was concentrated and then cooled, and the crystalline solid which separated was collected on a filter and washed with a little benzene. There was thus obtained 35 g. of 2-(2-ethoxy-1-naphthyl)oxazolidine, which when recrystallized from benzene melted at 91–93° C.

B. A solution of 33.5 g. of 2-(2-ethoxy-1-naphthyl)-oxazolidine in 275 ml. of warm anhydrous benzene was added in a thin stream to 300 ml. of an anhydrous ether solution of p-chlorobenzylmagnesium chloride, the Grignard reagent being prepared by the interaction of 93.5 g. of p-chlorobenzyl chloride and 14 g. of magnesium. The reaction mixture was then heated under reflux for two hours. The mixture was cooled and poured into a mixture of ice and hydrochloric acid. After vigorous stirring, a crystalline precipitate separated, and this solid was collected on a filter, washed with ether and benzene, and dried. The product thus obtained, p-chloro-N-(2-hydroxyethyl) - alpha - (2 - ethoxy - 1 - naphthyl)phenethylamine hydrochloride, weighed 47 g. After recrystallization from methanol, the compound melted at 189–193° C. The free base, which was obtained by regeneration from the hydrochloride as an oil, reacted with d-tartaric acid to yield a d-bitartrate, M. P. 114–124° C.

EXAMPLE 3

*p-Chloro-N-(2-chloroethyl)-alpha-(2-ethoxy-1-naphthyl)phenethylamine*

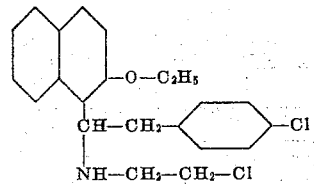

10 ml. of thionyl chloride was added to 2 g. of p-chloro-N-(2-hydroxyethyl) - alpha - (2-ethoxy - 1 - napthyl)phenethylamine hydrochloride, obtained by the method described in Example 2. After the reaction subsided, the mixture was warmed on a steam bath and the excess thionyl chloride was removed under reduced pressure. The viscous residue crystallized when boiled with water. The mixture was cooled and the solid was collected on a filter. This product was dried and then was recrystallized from a methanol-ether mixture. There was thus obtained p-chloro-N-(2-chloroethyl)-alpha-(2-ethoxy-1-naphthyl)phenethylamine hydrochloride, M. P. 200–201° C.

EXAMPLE 4

*N - methyl - alpha - ethyl - alpha - (2 - hydroxy - 1-naphthyl)phenethylamine*

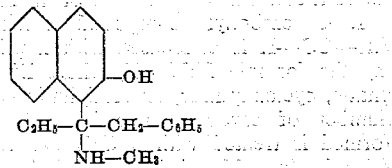

A. A solution of 6.2 g. of methylamine in 20 ml. of benzene was added to a cold solution of 26.2 g. of benzyl 2-hydroxy-1- naphthyl ketone in 100 ml. of benzene. The reaction mixture became slightly warm and then a yellow solid separated from solution. This solid, N-methyl-1-(2-hydroxy-1-napthyl)-2-phenylethylidenimine, weighed 31 g. When recrystallized from benzene, the compound melted at 93–125° C.

B. 10 g. of N-methyl-1-(2-hydroxy-1-naphthyl)-2-phenylethylidenimine was dissolved in a mixture of anhydrous ether and dioxane. This solution was added to an anhydrous ether solution of ethylmagnesium bromide, the Grignard reagent being prepared by the interaction of 3.5 g. of magnesium and 15.9 g. of ethyl bromide. The reaction mixture was heated under reflux on a steam bath for two hours and was then cooled and poured into a mixture of ice and hydrochloric acid. There separated from the solution an oil which solidified on refrigeration. The solid was collected on a filter, washed successively with water and with ether, dried, and recrystallized from a mixture of methanol and ether. There was thus obtained 6.5 g. of yellow crystals of N-methyl-alpha-ethyl-alpha - (2 - hydroxy - 1 - naphthyl)phenethylamine hydrochloride. After recrystallization from anhydrous ethanol, the compound sintered at about 188° C. and melted with decomposition at 200–210° C.

EXAMPLE 5 p-Methyl - N - (2 - hydroxyethyl) - alpha - (2 - methoxy-1-naphthyl)phenethylamine

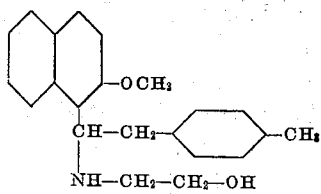

A. To a solution of 100 g. of 2-methoxy-1-naphthaldehyde in benzene there was added 107.6 g. of ethanolamine. The mixture was heated on a steam bath for seven or eight hours and then concentrated. On cooling the solution, there separated 2-(2-methoxy-1-naphthyl)oxazolidine, M. P. 100–102° C.

B. 29.3 g. of 2-(2-methoxy-1-naphthyl)oxazolidine was dissolved in hot benzene and the solution was added over a period of about twenty minutes to an anhydrous ether solution of p-methylbenzylmagnesium chloride, the Grignard reagent being prepared by interaction of 36 g. of p-methylbenzyl chloride and 6.8 of magnesium. The mixture was refluxed for two and one-half hours and was then cooled and poured into a mixture of ice and hydrochloric acid. The crystalline precipitate which separated from solution was collected on a filter and washed with benzene and ether. There was thus obtained 28 g. of crude p - methyl - N - (2 - hydroxyethyl) - alpha - (2 - methoxy-1-naphthyl)phenethylamine hydrochloride, which when purified by recrystallization from methanol melted at 219–220° C. The free base, which was regenerated from the hydrochloride as an oil, reacted with hydrobromic acid to form a hydrobromide, M. P. 250–210° C.

EXAMPLE 6

N - methyl - alpha - (1,2,3,4 - tetrahydro - 6 - naphthyl)phenethylamine

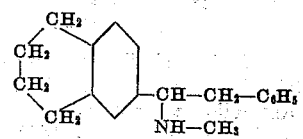

A. 32 g. of 1,2,3,4-tetrahydro-6-naphthaldehyde was dissolved in 130 ml. of benzene and the solution was cooled to 12° C. To this solution was added a solution of 9.3 g. of methylamine in benzene, and the mixture was shaken vigorously in a stoppered flask and allowed to stand at room temperature for two days. The mixture was then distilled. The fraction distilling at 88–99° C. (0.07–0.17 mm.), which was N-methyl-1,2,3,4-tetrahydro-6-naphthalimine, weighed 33 g. and had a $d^{25}$ of 1.018 and $n_D^{25}$ 1.5735.

B. To a solution of 30 g. N-methyl-1,2,3,4-tetrahydro-6-naphthalimine in 50 ml. of anhydrous ether there was added an anhydrous ether solution of benzylmagnesium chloride prepared by the interaction of 87.6 of benzyl chloride and 16.9 g. of magnesium according to the method described in "Organic Syntheses," collective vol. 1, 2nd ed., page 471. The reaction mixture was refluxed for two hours. The mixture was then cooled and poured into a mixture of ice and hydrochloric acid. The precipitate which separated from solution was collected on a filter, washed with ether, and dried. The crude product thus obtained was purified by recrystallization from methanol, yielding 24.1 g. of N-methyl-alpha(1,2,3,4-tetrahydro-6-naphthyl)phenethylamine hydrochloride hydrochloride. The pure compound melted at 225–227° C.

EXAMPLE 7

N - (2 - diethylaminoethyl) - alpha - 1,2,3,4 - tetrahydro-6-naphthyl)phenethylamine

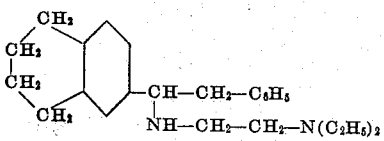

A. 16 g. of 1,2,3,4-tetrahydro-6-naphthaldehyde was dissolved in 75 ml. of benzene and to this solution there was added a solution of 13 g. of N,N-diethylethylenediamine. The reaction mixture was shaken vigorously and was then distilled at reduced pressure. The fraction distilling at 145–155° C. (0.04 mm.) was N-(2-diethylaminoethyl)-1,2,3,4-tetrahydro-6-naphthalimine. The yield was 24 g.

B. 39.2 g. of benzyl chloride and 7.5 g. of magnesium were interacted in ether solution under anhydrous conditions, thus forming benzylmagnesium chloride. To this Grignard reagent there was added an ether solution of 20 g. of N-(2-diethylaminoethyl)-1,2,3,4-tetrahydro-6-naphthalimine. The mixture was heated under reflux for one hour, allowed to cool, and then poured into a mixture of ice and hydrochloric acid. The solution was filtered and the filtrate was washed with ether, the ether layer being discarded. The aqueous layer was made alkaline with sodium hydroxide solution and was extracted with ether. The ether solution was washed with water, dried over anhydrous sodium sulfate, and the ether was removed by distillation. The residue was dissolved in methanol, and hydrogen chloride was bubbled into the solution. Anhydrous ether was added to the acidic solution and there separated a gum which crystallized on standing. This solid was collected on a filter and then recrystallized from methanol. There was thus obtained 8.4 g. of N-(2-diethylaminoethyl)-alpha-(1,2,3,4-tetrahydro-6-napthyl)phenethylamine dihydrochloride, M. P. 202–207° C. From the mother liquor there was obtained a second crop of the dihydrochloride, M. P. 202–209° C.

EXAMPLE 8

N, alpha-dimethyl-alpha-(2-naphthyl)phenethylamine

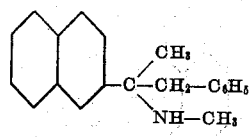

To a solution of 51 g. of methyl 2-naphthyl ketone in 100 ml. of benzene there was added a solution of 15.5 g. of methylamine in benzene. On standing, the reaction mixture became cloudy. The mixture was dried over anhydrous potassium carbonate. This solution, which contained N-methyl-1-(2-naphthyl)ethylidenimine, was slowly added with stirring to an anhydrous ether solution containing benzylmagnesium chloride, the Grignard reagent being prepared by the interaction of 190 g. of benzyl chloride and 36.5 g. of magnesium. The reaction mixture was heated under reflux for one and one-half hours and then allowed to stand overnight at room temperature. The mixture was then poured into a mixture of ice and hydrochloric acid. An oil separated from solution. This oil was dissolved in a mixture of aqueous sodium hydroxide solution and ether. The ether solution was dried over anhydrous sodium sulfate and then over anhydrous calcium sulfate. Hydrogen chloride was bubbled into the dry ether solution and the gummy solid which precipitated was crystallized from an acetone-ether mixture. This product was N,alpha-dimethyl-alpha-(2-naphthyl)-phenethylamine hydrochloride, M. P. 222–223° C.

EXAMPLE 9

*N-methyl-alpha-(2-hydroxy-1-naphthyl)phenethylamine*

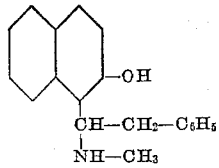

A solution of 25 g. of N-methyl-2-hydroxy-1-naphthalimine in 75 ml. of warm anhydrous benzene was added to 200 ml. of an anhydrous ether solution of benzylmagnesium chloride, the Grignard reagent being prepared by the interaction of 68.2 g. of benzyl chloride and 13.1 g. of magnesium. The reaction mixture was heated under reflux for two hours and then cooled and poured into a mixture of ice and hydrochloric acid. The oil which separated solidified on standing. This solid was collected on a filter, dried, and recrystallized from anhydrous ethanol. There was thus obtained 7.2 g. of N-methyl-alpha-(2-hydroxy-1-naphthyl)phenethylamine hydrochloride, M. P. 179–226° C. An additional 7.1 g. of this product was obtained by adding water to the filtrate.

EXAMPLE 10

*N-(2-hydroxyethyl)-alpha-(2-hydroxy-1-naphthyl)-phenethylamine*

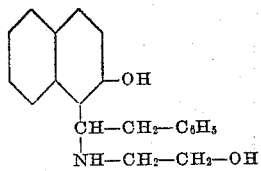

Employing a procedure similar to that of Example 9, 0.13 mole of 2-(2-hydroxy-1-naphthyl)oxazolidine (prepared by reacting 2-hydroxy-1-naphthaldehyde with ethanolamine), M. P. 148–152.5° C., and 0.6 mole of benzylmagnesium chloride were interacted and there was thus obtained 6.4 g. of N-(2-hydroxyethyl)-alpha-(2-hydroxy-1-naphthyl)phenethylamine hydrochloride, M. P. 163–167° C. (dec.).

EXAMPLE 11

*N-methyl-alpha-(2-methoxy-1-naphthyl)phenethylamine*

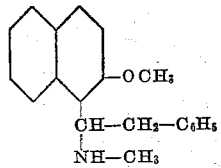

4 g. of N-methyl-2-methoxy-1-naphthalimine (prepared by reacting 2-methoxy-1-naphthaldehyde with methylamine), M. P. 62.5–63.5° C., was dissolved in 50 ml. of ether and this solution was added to 150 ml. of an anhydrous ether solution of benzylmagnesium chloride, the Grignard reagent being prepared by the interaction of 44 g. of benzyl chloride and 7.3 g. of magnesium. The mixture was heated under reflux for two hours and was then cooled and poured into a mixture of ice and hydrochloric acid. The gummy precipitate which separated soon crystallized. This solid was collected on a filter and recrystallized from a mixture of anhydrous ether and anhydrous ethanol. There was thus obtained 12.1 g. of N-methyl-alpha-(2-methoxy-1-naphthal)phenethylamine hydrochloride, M. P. 156–159°.

EXAMPLE 12

*N-methyl-alpha-(1-naphthyl)phenethylamine*

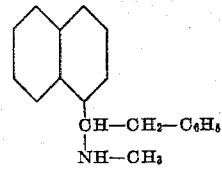

N-methyl-1-naphthalimine (prepared by reacting 1-naphthaldehyde with methylamine), boiling range 92–100° C. (0.1 mm.), was treated with benzylmagnesium chloride and the reaction product was hydrolyzed with cold hydrochloric acid by a procedure similar to that described in part B of Example 1. There was thus obtained N-methyl-alpha-(1-naphthyl)phenethylamine hydrochloride, M. P. 194–196.5° C.

EXAMPLE 13

*N-methyl-alpha-(2-ethoxy-1-naphthyl)phenethylamine*

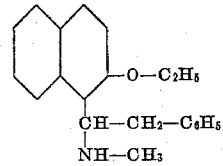

A solution of 21.3 g. of N-methyl-2-ethoxy-1-naphthalimine in 75 ml. of anhydrous benzene was added to 150 ml. of an anhydrous ether solution of benzylmagnesium chloride, the Grignard reagent being prepared by the interaction of 50.6 g. of benzyl chloride and 9.7 g. of magnesium. The reaction mixture was heated under reflux for two hours and was then cooled and poured into a mixture of ice and hydrochloric acid. There separated an oil which crystallized on standing. This solid was collected on a filter and was recrystallized from a mixture of methanol and ether. There was thus obtained 13.0 g. of crystals of N-methyl-alpha-(2-ethoxy-1-naphthyl)phenethylamine hydrochloride, M. P. 99–102° C., which contained methanol as solvent of crystallization.

EXAMPLE 14

*N-(2-hydroxyethyl)-alpha-(-1-naphthyl)phenethylamine*

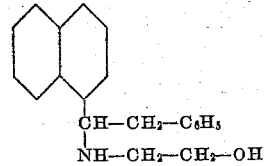

Employing a procedure similar to that of Example 13, there was obtained, by the interaction of 0.15 mole of 2-(1-naphthyl)oxazolidine (prepared by reacting ethanolamine with 1-naphthaldehyde), b. p. 146° C. (0.3 mm.), and 0.6 mole of benzylmagnesium chloride, 26 g. of N-(2-hydroxyethyl)-alpha-(1-naphthyl)phenethylamine hydrochloride, M. P. 182° C. The free base, which was regenerated from the hydrochloride as an oil, reacted with nitric acid to form a nitrate, M. P. 104–128° C., and with hydrobromic acid to form a hydrobromide, M. P. 172–174° C.

EXAMPLE 15

*N-(2-hydroxyethyl)-alpha-(2-naphthyl)phenethylamine*

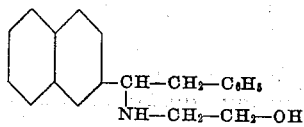

N-(2-hydroxyethyl)-2-naphthalimine (prepared by interaction of 2-naphthaldehyde and ethanolamine) was treated with benzylmagnesium chloride and the reaction product thus obtained was hydrolyzed with cold hydrochloric acid by a procedure similar to that described in part B of Example 1. There was thus obtained N-(2-hydroxyethyl)-alpha-(2-naphthyl)-phenethylamine hydrochloride, M. P. 222–224° C.

EXAMPLE 16

*N-(2-hydroxyethyl)-alpha-(2-methoxy-1-naphthyl)phenethylamine*

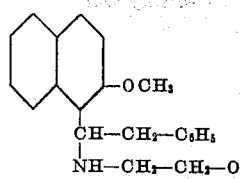

30 g. of 2-(2-methoxy-1-naphthyl)oxazolidine, prepared as in part A of Example 5, was dissolved in ether and this solution was added slowly to an anhydrous ether solution of benzylmagnesium chloride, the Grignard reagent being prepared by the interaction of 100 g. of benzyl chloride and 22 g. of magnesium. The reaction mixture was heated under reflux for four hours. The mixture was then cooled and poured into a mixture of ice and hydrochloric acid. The solid which separated was collected on a filter, washed with ether, and then crystallized from methanol. There was thus obtained 18 g. of N-(2-hydroxyethyl)-alpha-(2-methoxy-1-naphthyl)phenethylamine hydrochloride, M. P. 202–210° C.

EXAMPLE 17

*N-(2-diethylaminoethyl)-alpha-(2-methoxy-1-naphthyl)-phenethylamine*

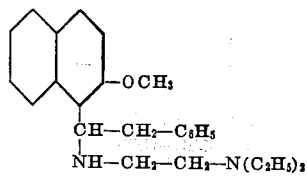

A. 21.6 g. of 2-methoxyl-1-naphthaldehyde was dissolved in 100 ml. of warm benzene. The solution was cooled and 15 g. of N,N-diethylethylenediamine was added. The mixture was shaken vigorously and was then distilled. The fraction distilling at 150–163° C. (0.01 mm.) was crude N-(2-diethylaminoethyl)-2-methoxy-1-naphthalimine.

B. 20 g. of N-(2-diethylaminoethyl) - 2 - methoxy-1-naphthalimine was dissolved in anhydrous ether and this solution was added to an anhydrous ether solution of benzylmagnesium chloride, the Grignard reagent being prepared by the interaction of 35.6 g. of benzyl chloride and 6.8 g. of magnesium. The mixture was heated under reflux for two hours, and was then cooled and poured into a mixture of ice and hydrochloric acid. The aqueous layer of the hydrolysis mixture was washed with ether several times, made alkaline with sodium hydroxide solution, and then extracted with ether. The ether extract was washed with water, dried over anhydrous sodium sulfate, and evaporated to remove the ether. The residue was dissolved in 200 ml. of ethanol and hydrogen chloride was bubbled into the solution. A gum which crystallized when stirred separated from solution on addition of the ether. The solid was collected on a filter, washed, and dried. There was thus obtained 26.5 g. of N - (2 - diethylaminoethyl) - alpha - (2 - methoxy - 1-naphthyl)phenethylamine dihydrochloride, which when recrystallized from methanol melted at 160–168° C.

EXAMPLE 18

*N - (3 - diethylaminopropyl) - alpha - (2 - hydroxy - 1-naphthyl)phenethylamine*

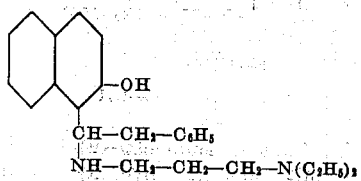

37 g. of N-(3-diethylaminopropyl)-2-hydroxy-1-naphthalimine (prepared by interacting N,N - diethyl - 1,3-propanediamine and 2-hydroxy-1-naphthaldehyde) was added to a benzene solution of benzylmagnesium chloride, the Grignard reagent being prepared from 65.8 g. of benzyl chloride and 12.7 g. of magnesium. The reaction mixture was heated under reflux for three and one-half hours and was then cooled and poured into a mixture of ice and hydrochloric acid. The mixture was extracted with ether, and the ether solution was washed with water, was dried, and was then concentrated. The residue thus obtained, which weighed 35.5 g., was dissolved in methanol and hydrogen chloride was bubbled into the solution. Anhydrous ether was added to the solution, whereupon a gummy solid precipitated. Recrystalization of this crude product yielded N-(3-diethylaminopropyl) - alpha - (2 - hydroxy - 1 - naphthyl)phenethylamine dihydrochloride, M. P. 161–166° C.

EXAMPLE 19

*N-ethyl-alpha-(2-hydroxy-1-naphthyl)phenethylamine*

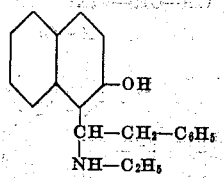

When N-ethyl-2-hydroxy-1-naphthalimine, M. P. 118–121° C. (prepared by interacting 2-hydroxynaphthaldehyde and ethylamine) was reacted, by a procedure similar to that described in part B of Example 1, with benzylmagnesium chloride and the resulting addition compound was decomposed with cold hydrochloric acid, there was obtained N - ethyl - alpha - (2 - hydroxy - 1 - naphthyl)-phenethylamine hydrochloride. The compound gradually melted over a wide temperature range, 107–150° C.

EXAMPLE 20

*N - isopropyl - alpha - (2 - methoxy - 1 - naphthyl)phenethylamine*

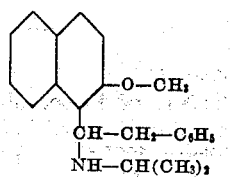

Using a procedure similar to that described in part B of Example 1, 0.11 mole of N-isopropyl-2-methoxy-1-naphthalimine (prepared by interaction of 2-methoxy-1-naphthaldehyde and isopropylamine), B. P. 123° C. (0.2 mm.), was reacted with 0.43 mole of benzylmagnesium chloride and the addition compound was decomposed with hydrochloric acid. There was thus obtained 33 g. of N-isopropyl-alpha-(2-methoxy-1-naphthyl)phenethylamine hydrochloride, M. P. 228–229.5° C.

EXAMPLE 21

*N - (2 - hydroxyethyl) - alpha - [2 - (2 - diethylaminoethoxy)-1-naphthyl]phenethylamine*

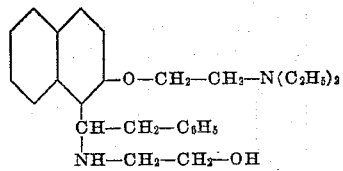

9.7 g. of 2-(2-diethylaminoethoxy)-1-naphthaldehyde (prepared by interaction of 2-hydroxy-1-naphthaldehyde and 2-diethylaminoethyl chloride), M. P. 53.5–54.5° C., was reacted with about 2.5 g. of ethanolamine, thus forming 2-(2-diethylaminoethoxy-1-naphthyl)oxazolidine. This product was treated, in a manner similar to that described in part B of Example 1, with benzylmagnesium chloride and the resulting addition compound was decomposed with cold hydrochloric acid. There was thus obtained 10.9 g. of N(2-hydroxyethyl)-alpha-[2-(2-diethylaminoethoxy)-1-naphthyl]phenethylamine dihydrochloride, which, when recrystallized from methanol-ether mixture, melted at 173–200° C.

EXAMPLE 22

*N - (2 - chloroethyl) - alpha - [2 - (2 - diethylaminoethoxy)-1-naphthyl]phenethylamine*

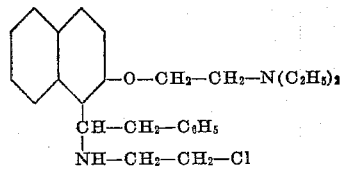

In a manner similar to that described in Example 3, N - (2 - hydroxyethyl) - alpha - [2 - (2 - diethylaminoethoxy) - 1 - naphthyl]phenethylamine dihydrochloride (obtained as described in Example 21) was treated with thionyl chloride. There was thus obtained N-(2-chloroethyl) - alpha - [2 - (2 - diethylaminoethoxy) - 1 - naphthyl]-phenethylamine dihydrochloride, M. P. 189–193° C.

EXAMPLE 23

*N-methyllyl-alpha-(1-naphthyl)phenethylamine*

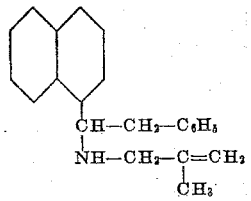

Using a procedure similar to that described in part B of Example 1, 20.0 g. of N-methallyl-1-naphthalimine (prepared by interaction of 1-naphthaldehyde and methallylamine), distilling at 108° C. (0.07 mm.), was reacted with a benzene solution of benzylmagnesium chloride, the Grignard reagent being prepared from 49.6 g. of benzyl chloride and 9.52 g. of magnesium. The addition product was decomposed with cold hydrochloric acid, thus yielding 26.8 g. of N-methallyl-alpha-(1-naphthyl)phenethylamine hydrochloride, M. P. 232–233° C.

EXAMPLE 24

*N-[2-(2-hydroxyethylamino)ethylamino]-alpha-(1-naphthyl)phenethylamine*

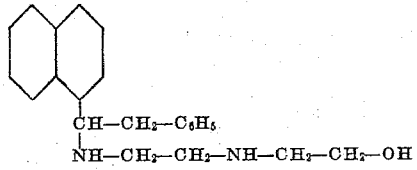

N-[2-(2-hydroxyethylamino)ethyl]naphthalimine [prepared by interaction of 1-naphthaldehyde and 2-(2-diethylaminoethyl)aminoethanol], distilling at 78° C. (0.17 mm.), was reacted in benzene with benzylmagnesium chloride, and the resulting reaction product was decomposed with cold hydrochloric acid in a manner similar to that described in part B of Example 1. There was thus obtained N - [2 - (2 - hydroxyethylamino)ethylamino]-alpha-(1-naphthyl)phenethylamine dihydrochloride, M. P. 209–211° C.

EXAMPLE 25

*N-(1-methyl-4-diethylaminobutyl)-alpha-(1-naphthyl)phenethylamine*

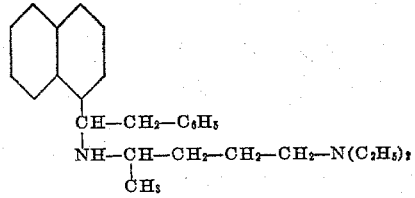

N - (1 - methyl - 4 - diethylamino)butyl - 1 - naphthalimine (prepared by interaction of 1-naphthaldehyde and N,N-diethyl-1,4-pentanediamine) was treated with benzylmagnesium chloride and the resulting reaction product was hydrolyzed with cold hydrochloric acid by a procedure similar to that described in part B of Example 1. There was thus obtained N-(1-methyl-4-diethylaminobutyl) - alpha - (1 - naphthyl)phenethylamine dihydrochloride, M. P. 256–257° C. (dec.).

EXAMPLE 26

*N-benzyl-alpha-[2(2-diethylaminoethoxy)-1-naphthyl]phenethylamine*

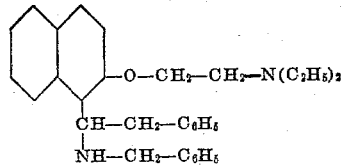

20 g. of 2-diethylaminoethoxy-1-naphthaldehyde was reacted with 7.8 g. of benzylamine, thus forming N-benzyl - 2 - (2 - diethylaminoethoxy) - 1 - napthalimine. This product was treated, in a manner similar to that described in part B of Example 1, with benzylmagnesium chloride and the addition compound was decomposed with cold hydrochloric acid. There was obtained 26 g. of N - benzyl - alpha - [2 - (2 - diethylaminoethoxy) - 1-naphthyl]phenethylamine dihydrochloride which, when recrystallized from ethanol containing a little hydrogen chloride, melted at 229–230° C.

EXAMPLE 27

*p-Methoxy-alpha-(1-naphthyl)phenethylamine*

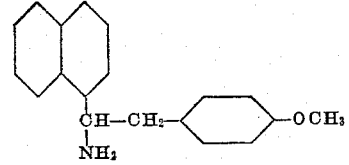

A. 124 g. of 1-bromonaphthalene and 14.6 g. of magnesium were interacted in 150 ml. of anhydrous ether and 125 ml. of anhydrous benzene. To this solution of 1-naphthylmagnesium bromide was added slowly a solution of 66.3 g. of p-methoxybenzyl cyanide in 25 ml. of anhydrous benzene. The reaction mixture was heated under reflux for one hour and was then cooled and poured into a mixture of ice and hydrochloric acid. An oil remained insoluble in both the ether and the water layers. The ether layer was removed and the oil was extracted from the aqueous layer with butanol. The ether layer and the butanol solution were combined and to the mixture was added a solution of 20 ml. of concentrated sulfuric acid in 105 ml. of water. The mixture was then steam distilled for about four hours to remove solvent and naphthalene. Ether was added to the distillation residue and after thorough shaking the ether solution was separated, washed first with water and then with sodium bicarbonate solution, and dried over anhydrous sodium sulfate. The solvent was evaporated from the dry solution and the residue was distilled at reduced pressure. The fraction distilling at about 165° C. (0.062 mm.) was crude 1-naphthyl p-methoxybenzyl ketone. The yield was 43.2 g.

B. 16.5 g. of crude 1-naphthyl p-methoxybenzyl ketone, 16 g. of hydroxylamine hydrochloride, and 23 g. of sodium acetate trihydrate were dissolved in 175 ml. of ethanol and 50 ml. of water. The mixture was heated under reflux for two and one-half hours. Most of the solvent was removed by evaporation at reduced pressure and the residue was stirred with a water-ether mixture. The ether layer was separated, washed with water, dried over anhydrous sodium sulfate, and evaporated to remove the ether. The residue, which was crude 1-naphthyl p-methoxybenzyl ketoxime, was dissolved in 100 ml. of glacial acetic acid, 0.3 g. of platinum oxide was added, and this mixture was hydrogenated at 50 lbs./sq. in. at 30–100° C. The hydrogenation mixture was then filtered. Most of the solvent was removed from the filtrate by evaporation below 50° C. and the residue was dissolved in ether. The ether solution was washed with dilute sodium hydroxide solution and then with water, after which the washed solution was extracted with dilute hydrochloric acid. The acidic aqueous layer was separated, washed with ether, and made basic by addition of sodium hydroxide solution. p-Methoxy-alpha-(1-naphthyl)phenethylamine separated from the solution as an oil. This oil was dissolved in ether and the ether solution was washed with water and then dried over anhydrous sodium sulfate. The ether was distilled from the dry solution below 40° C. at reduced pressure. The residue was dissolved in anhydrous ether and hydrogen chloride was bubbled into the solution. The precipitate which separated was collected on a filter, washed with ethyl ether, and dried. The product thus obtained, which was p-methoxy-alpha-(1-naphthyl)phenethylamine hydrochloride, weighed 4.6 g. When recrystallized from an acetone-water mixture, it sintered at 180–185° C. and melted at 210° C.

EXAMPLE 28

*Alpha-(2-hydroxy-1-naphthyl)phenethylamine*

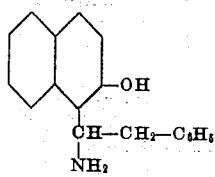

A solution of 21 g. of benzyl 2-hydroxy-1-naphthyl ketone, 21 g. of hydroxylamine hydrochloride, and 30 g. of sodium acetate trihydrate in a mixture of 210 ml. of ethanol and 60 ml. of water was heated under reflux for one and one-half hours. More water was added, the mixture was concentrated at reduced pressure, and the mixture was diluted with water and extracted with ether. The ether solution was washed with water, dried over anhydrous sodium sulfate, and then the ether was removed from the solution at reduced pressure. A little benzene was added to the residue and was removed at reduced pressure. The residue, which was crude benzyl 2-hydroxy-1-naphthyl ketoxime, was a crystalline solid, M. P. 129–144° C. When recrystallized from ethanol, the product melted at 139–145° C. The crude ketoxime was dissolved in 450 ml. of anhydrous ethanol in a flask fitted with a wide-bore condenser. The solution was heated to boiling and 37 g. of sodium was added rapidly through the condenser. When the reaction had subsided, 200 ml. of anhydrous ethanol was added and the mixture was heated on a steam bath until all of the sodium had reacted. Most of the solvent was then removed at reduced pressure and the residue was diluted with water and extracted with dilute hydrochloric acid. The acidic extract was washed with ether and was then made basic with sodium hydroxide solution. The gummy solid which precipitated was dissolved in ether, and the ether solution was dried first over anhydrous sodium sulfate and then over anhydrous calcium sulfate. By evaporating the solvent from a portion of the dry ether solution, there was obtained a residue of crude alpha-(2-hydroxy-1-naphthyl)-phenethylamine, which when recrystallized from a mixture of ether and petroleum ether melted at 141–143° C. When hydrogen chloride was bubbled through another portion of the dry ether solution containing the amine, there was obtained a gummy precipitate of alpha-(2-hydroxy-1-naphthyl)phenethylamine hydrochloride. When purified by recrystallization from water, the hydrochloride melted at 220–222° C.

EXAMPLE 29

*Alpha-(5-indanyl)phenethylamine*

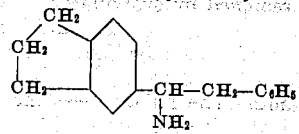

A. A mixture of 114 g. of hydrindene, 400 ml. of carbon disulfide, and 150 g. of phenylacetyl chloride was stirred at 25–30° C. and to this mixture there was added, during a period of thirty minutes, 155 g. of aluminum chloride. The reaction mixture was stirred for one hour at 30–35° C. and was then poured onto ice. This solution was steam distilled to remove carbon disulfide and hydrindene. The residue was cooled and the solid which separated was collected on a filter. There was thus obtained 175 g. of benzyl 5-indanyl ketone which, when recrystallized from ethanol, melted at 105–107° C.

B. 47.2 g. of benzyl 5-indanyl ketone was mixed with 200 ml. of 95% ethanol, 50 ml. of pyridine, and 27.8 g. of hydroxylamine hydrochloride. The mixture was heated under reflux for two hours, the solvents were evaporated from the reaction mixture, and the residue was collected on a filter and washed with water. There was thus obtained 57 g. of benzyl 5-indanyl ketoxime which, when recrystallized from ethanol, melted at 122–124° C.

C. 35 g. of benzyl 5-indanyl ketoxime was reduced by treating it with 650 ml. of anhydrous ethanol and 66.5 g. of sodium in a manner similar to the reduction described in Example 29, thus producing alpha-(5-indanyl)-phenethylamine. This amine, which was an oil, reacted with hydrochloric acid to yield alpha-(5-indanyl)phenethylamine hydrochloride, M. P. 242–256° C., which in turn reacted with silver nitrate to form alpha-(5-indanyl)-phenethylamine nitrate, M. P. 156° C. (dec.).

EXAMPLE 30

*Alpha-(2-naphthyl)phenethylamine*

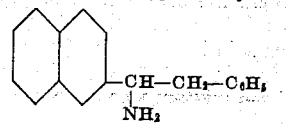

10 g. of benzyl 2-naphthyl ketoxime is dissolved in 160 ml. of 1.5 normal HCl in ethanol. 5 g. of 5% palladium-on-charcoal was added and the solution was hydrogenated at a hydrogen pressure of 50 lbs. per sq. in. The solution was then filtered and the solvent was evaporated from the filtrate. The residue was stirred with a mixture of aqueous sodium hydroxide solution, ether, and benzene. The ether-benzene layer was separated, washed with water, dried, and then evaporated to remove the solvents. The residue was dissolved in anhydrous ether and hydrogen chloride was bubbled into the ether solution. The precipitate which formed was collected on a filter, and then recrystallized from ethyl acetate. There was thus obtained 5 g. of alpha-(2-naphthyl)phenethylamine hydrochloride, M. P. 257–260° C.

EXAMPLE 31

*N,N-dimethyl-alpha-(1-naphthyl)phenethylamine*

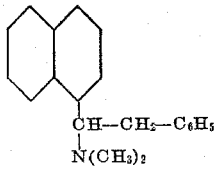

11.2 g. of alpha-(1-naphthyl)phenethyl alcohol was dissolved in 80 ml. of ethyl ether and to this solution was added dropwise 4.5 g. of phosphorus tribromide while maintaining the reaction mixture at about −10° C. The mixture was stirred at −10° C. for one hour and was then allowed to stand at room temperature for several hours. Ice water was added to the mixture, which was then stirred for about fifteen minutes. The ether layer was separated, dried over anhydrous sodium sulfate, and the ether was removed by evaporation. To the residue, which was alpha-(1-naphthyl)phenethyl bromide, there were added 30 g. of dimethylamine and 100 ml. of ether, and the mixture was allowed to stand for several days at room temperature. The mixture was then shaken with dilute sodium hydroxide solution. The ether layer was separated, washed with water, dried over anhydrous potassium carbonate, and the ether was removed by evaporation at about 40–60° C. The residue, which was crude N,N-dimethyl-alpha-(1-naphthyl)phenethylamine, was dissolved in anhydrous ethyl ether and hydrogen chloride was bubbled into the solution. The precipitate which formed was collected on a filter and purified by recrystallization from anhydrous ethanol. There was thus obtained 5.5 g. of N,N-dimethyl-alpha-(1-naphthyl)-phenethylamine hydrochloride, M. P. 212–214° C.

EXAMPLE 32

*1-[alpha-(1-naphthyl)phenethyl]piperidine*

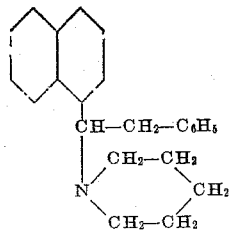

A. To a solution of 19 g. of alpha-(1-naphthyl)phenethyl alcohol in 100 ml. of anhydrous ether cooled to −10° C. there was added dropwise 7.7 g. of phosphorus tribromide. The mixture was stirred for an hour and then allowed to warm slowly to room temperature overnight. The mixture was stirred with ice water for fifteen minutes and the ether layer, which contained alpha-(1-naphthyl)phenethyl bromide, was separated and dried over anhydrous sodium sulfate.

B. The ether solution of alpha-(1-naphthyl)phenethyl bromide obtained in part A was mixed with 17.2 g. of piperidine and the mixture was allowed to stand at room temperature for twenty hours. The mixture was then filtered and the ethereal filtrate was washed with two portions of dilute sodium hydroxide solution. The ether solution was dried over anhydrous potassium carbonate and then evaporated at 60° C. under reduced pressure, finally using a pressure of 0.05 mm., to remove excess piperidine. The residue was dissolved in anhydrous ether and hydrogen chloride was bubbled into the solution. The precipitate which separated was collected on a filter and then recrystallized from anhydrous ethanol. There was thus obtained 7 g. of 1-[alpha-(1-naphthyl)-phenethyl]piperidine hydrochloride, M. P. 231–233° C.

EXAMPLE 33

*N,N-bis(2-hydroxyethyl)-alpha-(1-naphthyl)-phenethylamine*

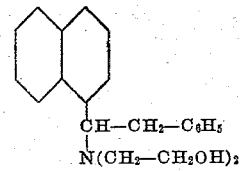

To a solution of 11.2 g. of alpha-(1-naphthyl)phenethyl alcohol in 80 ml. of ether there was added, dropwise, 4.5 g. of phosphorus tribromide while maintaining the reaction mixture at about −10° C. The mixture was stirred at −10° C. for one hour and was then allowed to stand at room temperature for several hours. Ice water was added to the mixture, which was then stirred for about fifteen minutes. The ether layer was separated, dried over anhydrous sodium sulfate, and the ether was removed by evaporation. To the residue, which was alpha-(1-naphthyl)phenethyl bromide, there were added 200 ml. of dioxane and 40 g. of diethanolamine. The mixture was allowed to stand at room temperature for several days and then the dioxane was evaporated from the solution at 60° C. under reduced pressure. The residue was dissolved in ether. The ether solution was washed successively with dilute sodium hydroxide solution and sodium chloride solution and then dried over potassium carbonate. Hydrogen chloride was bubbled into the dry ether solution, which contained N,N-bis(2-hydroxyethyl)-alpha-(1-naphthyl)phenethylamine. The gummy solid which precipitated was crystallized from ethyl methyl ketone. There was thus obtained 3.3 g. of white crystals of N,N-bis(2-hydroxyethyl)-alpha-(1-naphthyl)phenethylamine hydrochloride, M. P. 167–169° C. The free base reacted with d-tartaric acid to form a d-bitartrate, M. P. 65–110° C.; and with methyl iodide to form a methiodide, M. P. 145–148° C.

EXAMPLE 34

*4-[alpha-(1-naphthyl)phenethyl]morpholine*

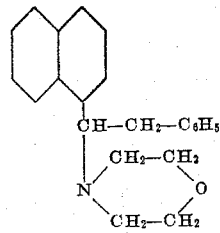

20 g. of morpholine was added to an ether solution of alpha-(1-naphthyl)phenethyl bromide, obtained as in part A of Example 32 from 19.9 g. of alpha-(1-naphthyl)-phenethyl alcohol and 7.7 g. of phosphorus tribromide. The mixture was allowed to stand at room temperature for two or three days. The mixture was then filtered and the ethereal filtrate was washed with two portions of dilute sodium hydroxide solution. The ether solution was dried over anhydrous potassium carbonate and then evaporated at 60° C., finally reducing the pressure to 0.05 mm., to remove excess morpholine. The residue, which was crude 4[alpha-(1-naphthyl)phenethyl]morpholine, was dissolved in anhydrous ether, and hydrogen chloride was bubbled into the solution. The precipitate which separated was collected on a filter. This product, which was 4-[alpha-(1-naphthyl)phenethyl]morpholine hydrochloride, weighed 15 g. When purified by crystallization from methanol, the compound melted at 267–270° C. Treatment of the hydrochloride with aqueous sodium hydroxide regenerated the amine, 4-[alpha-(1-naphthyl)phenethyl]morpholine, M. P. 122.5–123.5° C.

EXAMPLE 35

*N,N-bis(2-chloroethyl)-alpha-(1-naphthyl) phenethylamine*

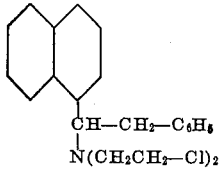

N,N-bis(2-hydroxyethyl)-alpha-(1-naphthyl)phenethylamine hydrochloride, obtained as described in Example 33, was treated with an excess of thionyl chloride at room temperature. After several hours the excess thionyl chloride was removed from the reaction mixture and the residue was crystallized from isobutyl methyl ketone. There was thus obtained N,N-bis(2-chloroethyl)-alpha-(1-naphthyl)phenethylamine hydrochloride, M. P. 148–151° C. The yield was about 90%.

EXAMPLE 36

*N-[2-(2-chloroethylamino)ethylamino]-alpha-(1-naphthyl)phenethylamine*

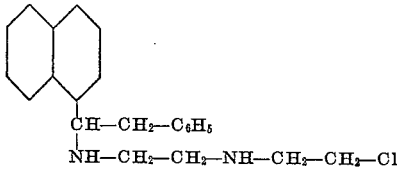

N-[2-(2-hydroxyethylamino)ethylamino] - alpha - (1-naphthyl)phenethylamine dihydrochloride, obtained as described in Example 24, was treated with an excess of thionyl chloride at room temperature. After several hours the excess thionyl chloride was removed from the reaction mixture and there was isolated from the residue, as an amorphous solid, N-[2-(2-chloroethylamino)ethylamino]-alpha - (1-naphthyl)penethylamine dihydrochloride, M. P. 80–197° C. An aqueous solution of the dihydrochloride was treated with nitric acid and there separated from solution crystals of N-[2-(2-chloroethylamino)ethylamino]-alpha-(1 - naphthyl)phenethylamine dinitrate which when recrystallized from hot water melted at 167° C. (dec.).

EXAMPLE 37

*N-(2-morpholinoethyl)-alpha - (2-methoxy-1-naphthyl)phenethylamine*

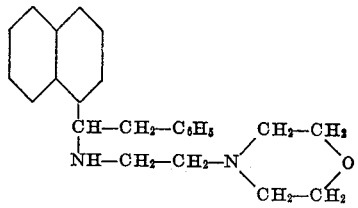

One mole of N-morpholinoethyl-2-methoxy-1-naphthalimine, prepared by interaction of 2-methoxy-1-naphthaldehyde with N-(2-aminoethyl)morpholine, was treated with four moles of benzylmagnesium chloride and the reaction product thus obtained was hydrolyzed with cold hydrochloric acid by a procedure similar to that described in part B of Example 1. There was thus obtained N-(2-morpholinoethyl) - alpha - (2 - methoxy-1-naphthyl) phenethylamine dihydrochloride, M. P. 131–160° C., but not completely clear until 192.5° C. was reached.

EXAMPLE 38

*Alpha-(1-naphthyl)phenethylamine*

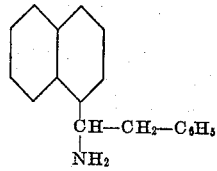

Benzyl 1-naphthyl ketone was converted to the oxime and this product was reduced with sodium and alcohol, thereby yielding alpha - (1 - naphthyl)phenethylamine. When this base was treated with hydrochloric acid, there was obtained alpha-(1-naphthyl)phenethylamine hydrochloride, M. P. 218° C. (dec.).

We claim:

1. A compound of the class consisting of 1-(bicyclic carbocyclic aryl)-2-(monocyclic carbocyclic aryl)ethylamines having the formula

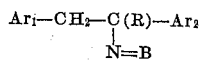

where $Ar_1$ is a monocyclic carbocyclic aryl radical of the class consisting of phenyl, halophenyl (lower alkyl) phenyl, and (lower alkoxy)phenyl radicals; $Ar_2$ is a bicyclic carbocyclic fused-ring aryl radical of the class consisting of naphthyl, dihydronaphthyl, tetrahydronaphthyl, indenyl, and indanyl radicals, and said radicals substituted by a member of the class consisting of hydroxyl, lower alkoxyl, and di-(lower alkyl)amino-lower alkoxyl radicals; R is a member of the class consisting of hydrogen and lower alkyl radicals having 1–4 carbon atoms; and —N=B is a member of the class consisting of (a) the primary amino group —NH$_2$ and (b) amino groups wherein the number of carbon atoms is 1–12 and consisting of secondary and tertiary alkylamino, alkenylamino, monohalo-alkylamino, hydroxyalkylamino, N,N-(dialkyl)aminoalkylamino, N-(hydroxyalkyl)aminoalkylamino, (N-morpholinyl)-alkylamino, benzylamino, cyclohexylamino, cyclopentylamino, N-piperidyl, N-pyrrolidyl, N-morpholinyl, and N-piperazinyl radicals.

2. A 1-(bicyclic carbocyclic aryl)-2-(monocyclic carbocyclic aryl)ethylamine having the formula

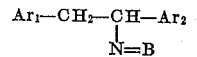

where $Ar_1$ is a halophenyl radical; $Ar_2$ is a (lower alkoxy)-naphthyl radical; and —N=B is a hydroxyalkylamino radical wherein the number of carbon atoms is 1–12.

3. A 1-(bicyclic carbocyclic aryl)-2-(monocyclic carbocyclic aryl)ethylamine having the formula

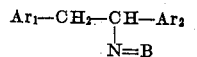

where $Ar_1$ is phenyl; $Ar_2$ is a (lower-alkoxy)naphthyl radical; and —N=B is an alkylamino radical wherein the number of carbon atoms is 1–12.

4. A 1-(bicyclic carbocyclic aryl)-2-(monocyclic carbocyclic aryl)ethylamine having the formula

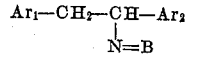

where $Ar_1$ is a (lower alkyl)phenyl radical; $Ar_2$ is a (lower alkoxy)naphthyl radical; and —N=B is a hydroxyalkylamino radical wherein the number of carbon atoms is 1–12.

5. A 1-(bicyclic carbocyclic aryl)-2-(monocyclic carbocyclic aryl)ethylamine having the formula

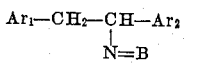

where Ar₁ is phenyl; Ar₂ is naphthyl; and —N=B is an alkyl amino group wherein the number of carbon atoms is 1–12.

6. A 1-(bicyclic carbocyclic aryl)-2-(monocyclic carbocyclic aryl)ethylamine having the formula

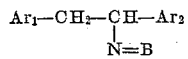

where Ar₁ is phenyl; Ar₂ is a naphthyl radical; and —N=B is a hydroxyalkyl amino group wherein the number of carbon atoms is 1–12.

7. N-methyl-alpha-(4-methoxy-1-naphthyl)phenethylamine.

8. p-chloro-N-(2-hydroxyethyl)-alpha-(2-ethoxy-1-naphthyl)phenethylamine.

9. p-methyl-N-(2-hydroxyethyl)-alpha-(2-methoxy-1-naphthyl)phenethylamine.

10. N,N-dimethyl-alpha-(1-naphthyl)phenethylamine.

11. N,N-bis(2-hydroxyethyl)-alpha-(1-naphthyl)phenethylamine.

References Cited in the file of this patent

UNITED STATES PATENTS

| | | |
|---|---|---|
| 2,504,122 | Goodson et al. | Apr. 18, 1950 |
| 2,608,584 | Spurles et al. | Aug. 26, 1952 |

OTHER REFERENCES

Dodds et al., Proc. Roy. Soc. pp. 119–32 (1944).
Goodson et al., J. A. C. S., vol. 68, pp. 2174–75 (1946).
Moffett et al., J. A. C. S., vol. 69, pp. 1792–94 (1947).